United States Patent [19]

Sinclair

[11] Patent Number: 5,470,281
[45] Date of Patent: Nov. 28, 1995

[54] DRIVE APPARATUS FOR A CYCLE

[75] Inventor: Clive M. Sinclair, London, England

[73] Assignee: Sinclair Research Limited, London, England

[21] Appl. No.: 302,538

[22] Filed: Sep. 8, 1994

[51] Int. Cl.[6] ................................................ F16H 7/00
[52] U.S. Cl. ............................................ 474/139; 474/148
[58] Field of Search ............................ 474/139, 148–150

[56] References Cited

U.S. PATENT DOCUMENTS

| | | | |
|---|---|---|---|
| 468,078 | 2/1892 | Lumis | 474/139 X |
| 803,556 | 11/1905 | Charter | 474/139 |
| 1,394,328 | 10/1921 | Miller | 474/139 |
| 2,090,423 | 8/1937 | Morrell | 474/139 X |
| 2,664,758 | 1/1954 | Smits | 474/139 X |

*Primary Examiner*—Roger J. Schoeppel
*Attorney, Agent, or Firm*—Iandiorio & Teska

[57] ABSTRACT

Drive apparatus (2) for a cycle (4), which drive apparatus (2) comprises a frame (6), a motor (8), a first pulley (10) which is driven by the motor (8), a second pulley (12), and an endless belt (14) which passes around the two pulleys (10, 12) and which is driven by the first pulley (10), the drive apparatus (2) being such that during use the belt (14) as in driving engagement with a tire (16) of a wheel (18) of the cycle (4), and the drive apparatus (2) being such that during use the first pulley (10) does not engage the tire (16).

10 Claims, 3 Drawing Sheets

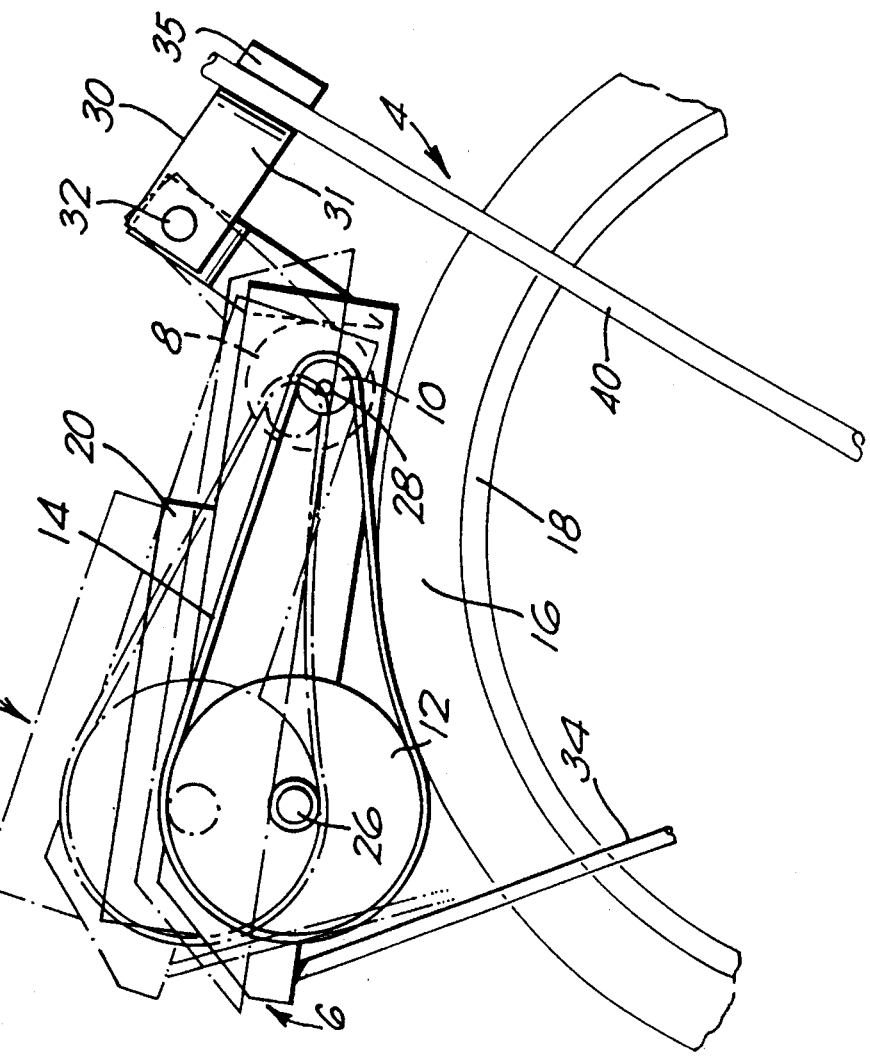
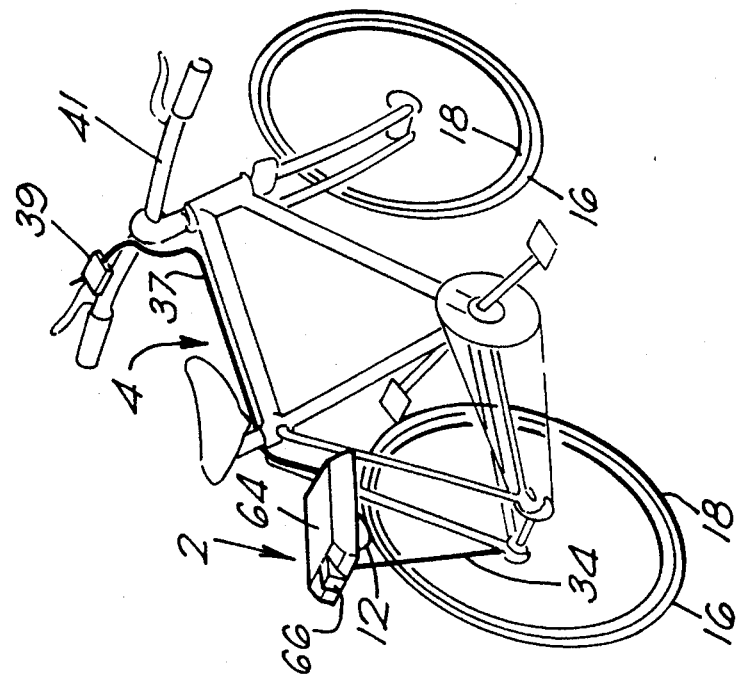

DRIVE APPARATUS FOR A CYCLE

This invention relates to drive apparatus for a cycle. This invention also relates to a cycle when provided with the drive apparatus.

It is known to provide drive apparatus for a cycle in which the drive apparatus comprises a motor which is an electric motor or an internal combustion engine motor. The motor is arranged to drive a roller which engages a tire of a wheel of the cycle and which thus drives the wheel of the cycle. This type of drive suffers from low efficiency. The pressure of the roller on the tire causes premature wear of the tire. Still further, due to the relatively small diameter of the roller in relation to the wheel, a substantial amount of slippage occurs between the roller and the tire.

It is an aim of the present invention to provide drive apparatus which obviates or reduces the above mentioned problems.

Accordingly, the present invention provides drive apparatus for a cycle, which drive apparatus comprises a frame, a motor, a first pulley which is driven by the motor, a second pulley, and an endless belt which passes around the two pullies and which is driven by the first pulley, the drive apparatus being such that during use the belt is in driving engagement with a tire of a wheel of the cycle, and the drive apparatus also being such that during use the first pulley does not engage the tire.

The belt enables a large drive area to be present between the belt and the tire. This avoids the premature tire wear and the excess wear which occurs when a drive roller directly engages the tire. For example, the drive area using the belt in the drive apparatus of the present invention may be twenty times as much as may be obtainable from the same motor if the drive is via a roller directly engaging the tire. Still further, the use of the belt enables the drive apparatus to be used equally satisfactorily with a wide range of tires.

The cycle may be a bicycle, a tricycle or any other suitable and appropriate velociped.

The drive apparatus may be one in which the first and the second pullies are the only pullies employed in the drive apparatus. Alternatively, if desired, other pullies may be employed in the drive apparatus.

Preferably, the first pulley is attached to the motor. Other arrangements for driving the first pulley via the motor may however be employed.

The size of the first pulley is a substantial factor in dictating the speed of the cycle. In the drive apparatus of the present invention, the size of the first pulley is advantageously chosen to given a cycle speed of fifteen miles per hour, which is the legal maximum speed at which a cycle may be driven in the United Kingdom without a driving licence.

The drive apparatus may be one in which the second pulley is in engagement with the tire during use of the drive apparatus. Alternatively, the drive apparatus may be one in which the second pulley is not in engagement with the tire during use of the drive apparatus.

Preferably, the drive apparatus is one in which the frame comprises a first frame part for supporting the motor, the first and the second pullies and the belt, and a second frame part for attaching to the cycle.

Preferably, the first and the second frame parts are hinged together with the first frame part being moveable under gravity relative to the second frame part, whereby the belt engages the tire with a force which is at least partially determined by the weight of components on the first frame part.

If desired, control means may be employed for increasing the force with which the belt engages the tire. The control means may be an elastic load-giving means. Any suitable and appropriate type of control means may be employed.

Preferably, the motor is an electric motor. If desired however, the motor may be an internal combustion engine such for example as a 2-stroke or a 4-stroke engine.

Where the motor is an electric motor, then the first frame part may also support a battery. The weight of the battery adds to the weight of the components on the first frame part which helps to increase the driving force with which the belt engages the tire. The battery will usually be a rechargeable battery.

The first frame part may comprise a platform. The platform can be of any suitable and appropriate length. The platform may have abutment retainer means for abutting against the battery and keeping the battery in place on the platform.

Advantageously, the second frame part is adapted to be bolted to a frame of the cycle. This enables the drive apparatus to be fitted to the majority of cycles without the need to effect modifications to the cycles.

If an electric motor is being used to drive the cycle and the cycle is prevented from being driven, then the electric motor may become overloaded, heat may be generated within windings of the electric motor, and the electric motor may eventually burn out. In order to prevent this happening, the electric motor is advantageously provided with an electric current limiting device.

A presently preferred electric current limiting device comprises a length of wire which is such that its electrical resistance increases as its temperature increases, the electric current limiting device being so connected to the electric motor that an overload condition causing the generation of heat in the electric motor also causes the generation of heat in the length of wire thereby to increase the temperature and the electrical resistance in the length of wire and to decrease the electric current allowed to pass to the electric motor.

If desired, the electric current limiting device may be a printed circuit board and/or a thermocouple. Such electrical current limiting devices are often complicated and expensive. The length of wire as the electric current limiting device is therefore preferred since it has the advantage that it is inexpensive to manufacture and is simple in operation. The length of wire forms a variable resitance device which enables full current from the battery to be applied to the electric motor at start up conditions when the length of wire is cold, thus enabling full drive power to be achieved, whilst at the same time affording the electric motor protection from burning out in overload conditions.

The length of wire will normally be chosen such that its electrical resistance increases substantially as its temperature increases. A presently preferred length of wire is made of nickel. With nickel, the electrical resistance of the length of wire increases by a factor of ten between the wire being at ambient temperature and the wire being at a red hot temperature. Metals other than nickel may be employed and an example of an alternative metal is tungsten.

Preferably, the length of wire is in the form of a coil.

The electric motor may be one is which the length of wire is provided in a sleeve device for preventing persons touching the length of wire and burning themselves when the length of wire is hot, and also for insulating the length of wire from adjacent metallic parts.

The sleeve device is preferably a silica tube. The sleeve device may be made of any suitable and appropriate non-conductive materials that are resistant to heat.

The drive apparatus may be such that it includes a heat sink for removing heat from the length of wire. The heat sink may be a housing for the length of wire, which housing is mounted to the frame.

The drive apparatus will usually be such that it drives the rear wheel of the cycle. If desired however the drive apparatus can be mounted so as to drive the or each front wheel of the cycle.

Embodiments of the invention will now be described solely by way of example and with reference to the accompanying drawings in which:

FIG. 1 shows first drive apparatus mounted on a cycle;

FIG. 3 is a side view of the drive apparatus as shown in FIG. 2, and illustrates in broken lines how the drive apparatus is pivotally mounted;

Figure 2:
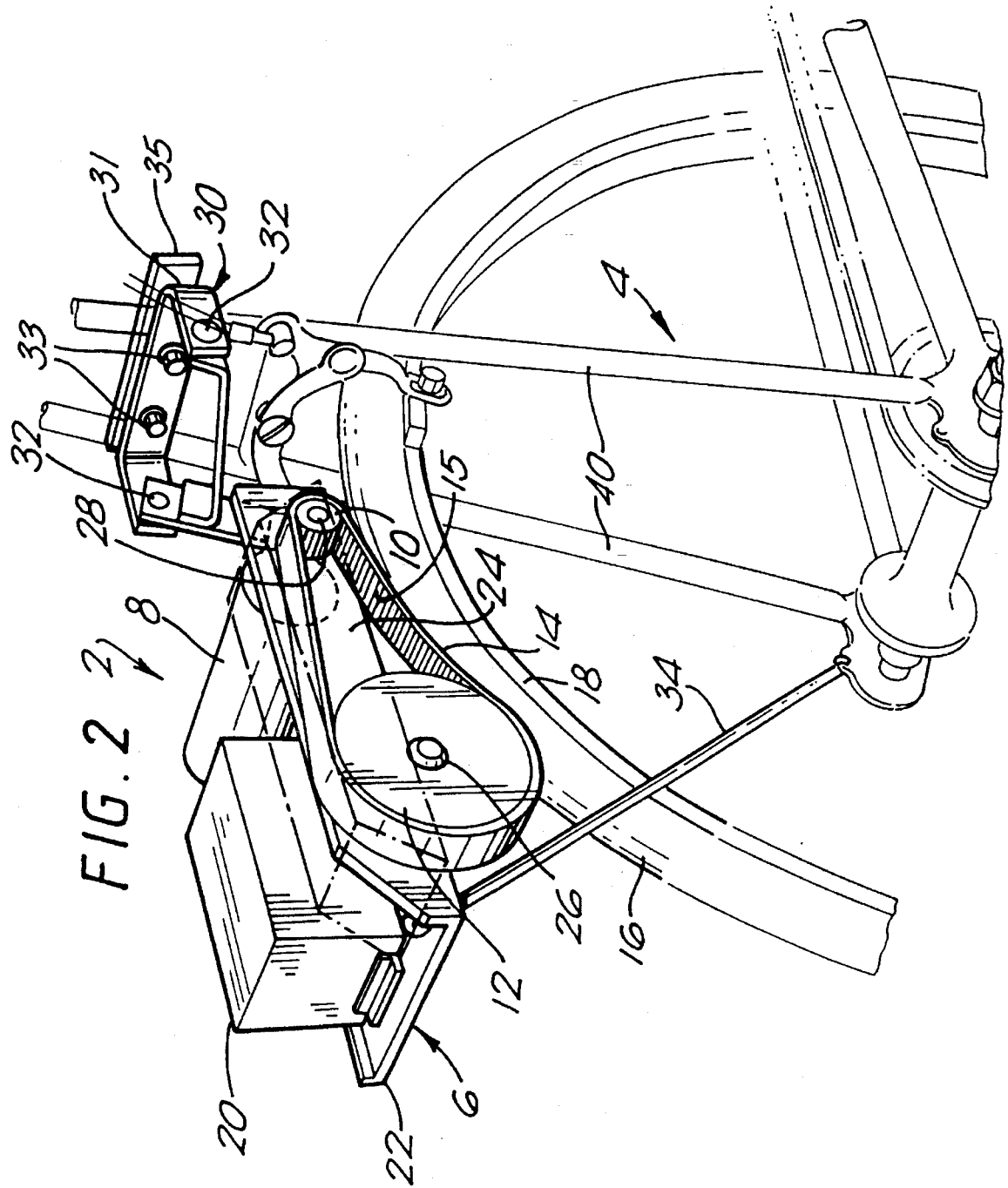
FIG. 2 is an enlarged view from the side and above of the drive apparatus shown in FIG. 1 and with a cover of the drive apparatus removed.

Referring to FIGS. 1–3, there is shown first drive apparatus 2 for a cycle 4. As can best be seen in FIG. 2, the drive apparatus 2 comprises a frame 6, a motor 8, a first pulley 10 which is driven by the motor 8, and a second pulley 12. The drive apparatus 2 also comprises an endless belt 14 which passes around the two pulleys 10, 12 and which is driven by the first pulley 10.

The drive apparatus 2 is such that during use the belt 14 is in driving engagement with a tire 16 of a wheel 18 of the cycle 4. The drive apparatus 2 is also such that during use, the first pulley 10 does not engage the tire 16. The belt 14 has teeth 15 for engaging with teeth on the pulley 10 as shown. The pulley 12 does not have teeth.

The motor 8 is an electric motor and it is driven by a rechargeable battery 20. As can be seen from FIGS. 2 and 3, the first and the second pullies 10, 12 are the only pullies employed in the drive apparatus 2. The first pulley 10 is attached to the motor 8.

As best shown in FIGS. 1 and 3, the second pulley 12 is in engagement with the tire 16. If desired, in an alternative embodiment of the invention (not shown), the second pulley 12 may be arranged so that it is not in engagement with the tire 16. The important thing is that, as shown in FIG. 3, the belt 14 is arranged to be in driving contact with the tire 16 over an appreciable length of the belt 14. The belt 14 thus provides a considerably increased area of contact with the tire 16 as compared with that obtainable if the tire 16 were to be driven by a roller. The increased area of contact of the belt 14 with the tire 16 enables increased frictional drive with reduced tire wear, again as compared with that achievable by a roller.

The frame 6 comprises a first frame part 22 which is L-shaped as shown. The first frame part 22 thus provides a platform on which the battery 20 and the motor 8 are able to sit. The first frame part 22 also provides an upstanding portion 24 for supporting a sprindle 26 on which the second pulley 12 is mounted. A spindle 28 for the first pulley 10 is arranged to pass through an aperture (not shown) in the upstanding portion 24 since the spindle 28 is driven directly by the motor 8.

The frame 6 also comprises a second frame part 30. The second frame part 30 enables the frame 6 to be attached to the frame 6 of the cycle 4 as shown.

The first and the second frame parts 22, 30 are hinged together as shown by hinge pins 32. The first frame part 22 is thus moveable under gravity relative to the second frame part 30. This means that the belt 14 engages the tire 16 with a force determined by the weight of components on the first frame part 22, plus a force exerted by control means in the form of an elastic load-giving member 34. The member 34 has a hook 36 at one end for hooking the member 34 to the frame 4 as shown in FIG. 2. The other end of the member 34 is passed through an aperture (not shown) in the first frame part 22 and is then bent over to form an enlarged portion 38. The enlarged portion 38 is maintained by a tie (not shown) which passes tightly around the enlarged portion 38. The enlarged portion 38 is then such that the member 34 cannot pull through the aperture in the first frame part 22. By appropriately adjusting the amount of the end of the member 34 that is bent over to form the enlarged portion 38, an appropriate and desired tension can be placed in the member 34.

The second frame part 30 is bolted to rear stays 40 of the cycle 4 by means of a U-bracket 31, bolts 33 and a clamping bar 35. Thus no modification is required to the cycle 4 in order to fit the drive apparatus 2.

The motor 8 is controlled via a cable 37 and a switch 39 which is mounted on handlebars 41 of the cycle 4.

Figure 4:
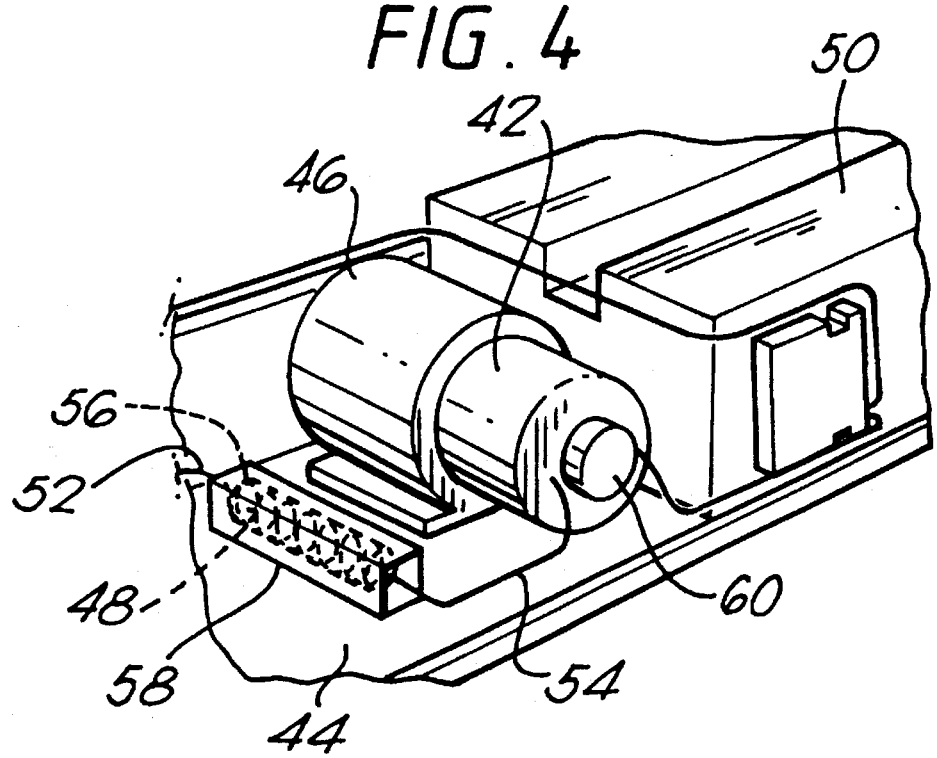
FIG. 4 is a perspective view showing part of second drive apparatus in which an electric motor is provided with an electric current limiting device.
Figure 5:
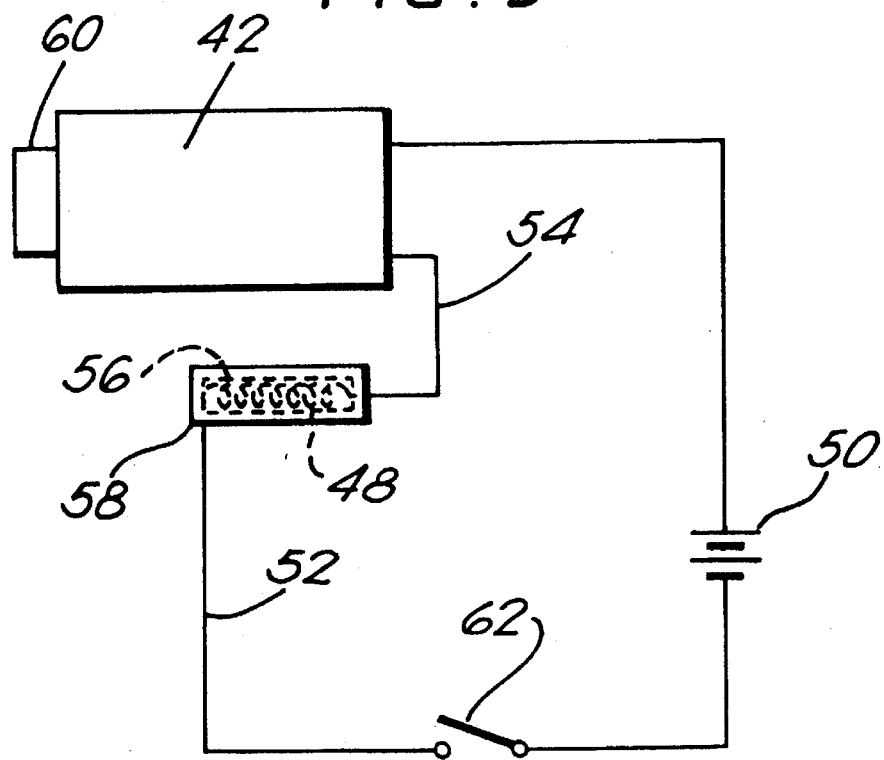
FIG. 5 shows the electric circuit employed in FIG. 4.

Referring now to FIGS. 4 and 5, there is shown part of second drive apparatus in which an electric motor 42 which is mounted on a frame base plate 44 by means of a mounting bracket 46. The electric motor 42 is provided with an electric current limiting device in the form of a length of wire 48. The length of wire 48 is such that its electrical resistance increases as its temperature increase. The length of wire 48 is so connected to the electric motor 42 that an overload condition causing the generation of heat in the electric motor 42 also causes the generation of heat in the length of wire 48, thereby to increase the temperature and the electrical resistance in the length of wire 48 and to decrease the electric current allowed to pass to the electric motor 42 from a battery 50 via leads 52, 54. The leads 52, 54 are in fact ends of the length of wire 48 but these ends have been provided with silicon rubber glass braid tinned cable in order to protect persons from heat when the length of wire 48 becomes hot.

The length of wire 48 is made of nickel. As can be seen from FIG. 4 and 5, the length of wire 48 is in the form of a coil.

The length of wire 48 is provided in a sleeve device in the form of a tube 56 which is preferably a silica tube 56. The tube 56 prevents persons touching the length of wire 48 and burning themselves when the length of wire 48 is hot. The tube 56 also insulates the length of wire 48 from adjacent metallic parts.

The length of wire 48 and its silica tube 56 are mounted in a heat sink in the form of a housing 58. The housing 58 is mounted to the frame base plate 44. The housing 58 helps to remove heat from the length of wire 48.

Drive from the electric motor 42 may be obtained via a drive spindle 60. A heat switch 62 (see FIG. 5) connects the battery 50 to the motor 42 via the length of wire 48.

As shown in FIG. 1, the drive apparatus 2 has a cover 64 for covering the motor 8, the first and second pullies 10, 12 and the battery 20. The cover 64 is shaped to form a rear mudguard for the cycle 4. The cover 64 has a reflector 66.

It is to be appreciated that the embodiments of the invention described above with reference to the accompanying drawing have been given by way of example only and that modifications may be effected. Thus, for example, instead of clamping the second frame part 30 to the cycle 4, any other suitable and appropriate fastening arrangement may be employed. Also, the cycle 4 shown in the drawings is a bicycle but the cycle could also be a tricycle or any other suitable and appropriate type of velociped. Control means other than the elastic load-giving member 34 may be employed for biasing the belt 14 into driving engagement with the tire 16. The frame base plate 44 shown in FIG. 4 could be part of the frame 6 shown in FIGS. 2 and 3. The tube 56 preferably has a quartz satin surface but other surface finishes may be employed. The length of wire 48 is preferably of pure nickel but a nickel alloy, tungsten or other metals may be employed.

I claim:

1. Drive apparatus for a cycle, which drive apparatus comprises a frame, a motor, a first pulley which is driven by the motor, a second pulley, and an endless belt which passes around the two pulleys and which is driven by the first pulley, the drive apparatus being such that during use the belt is in driving engagement with a tire of a wheel of the cycle, and the drive apparatus also being such that during use the first pulley does not engage the tire.

2. Drive apparatus according to claim 1 in which the frame comprises a first frame part for supporting the motor, the first and second pulleys, and a second frame part for attaching to the cycle.

3. Drive apparatus according to claim 2 in which the first and the second frame parts are hinged together with the first frame part being moveable under gravity relative to the second part, whereby the belt engages the tire with a force which is at least partially determined by the weight of components on the first frame part.

4. Drive apparatus according to claim 3 and including a flexible load-giving member for increasing the force with which the belt engages the tire.

5. Drive apparatus according to claim 1 in which the motor is an electric motor.

6. Drive apparatus according to claim 5 in which the electric motor is provided with an electric current limiting device.

7. Drive apparatus according to claim 6 in which the electric current limiting device comprises a length of wire which is such that its electrical resistance increases as its temperature increases, the electrical current limiting device being so connected to the electric motor that an overload condition causing the generation of heat in the electric motor also causes the generation of heat in the length of wire thereby to increase the temperature and the electrical resistance in the length of wire and to decrease the electric current allowed to pass to the electric motor.

8. Drive apparatus according to claim 7 in which the length of wire is made of nickel.

9. Drive apparatus according to claim 7 in which the length of wire is in the form of a coil.

10. Drive apparatus according to claim 7 in which the length of wire is provided in a sleeve device for preventing persons touching the length of wire and burning themselves when the length of wire is hot, and also for insulating the length of wire from adjacent metallic parts.

\* \* \* \* \*